(12) United States Patent
McGuire et al.

(10) Patent No.: US 10,699,383 B2
(45) Date of Patent: Jun. 30, 2020

(54) COMPUTATIONAL BLUR FOR VARIFOCAL DISPLAYS

(71) Applicant: NVIDIA Corp., Santa Clara, CA (US)

(72) Inventors: Morgan McGuire, Santa Clara, CA (US); Kaan Aksit, Santa Clara, CA (US); Pete Shirley, Santa Clara, CA (US); David Luebke, Charlottesville, VA (US)

(73) Assignee: NVIDIA Corp., Santa Clara, CA (US)

( * ) Notice: Subject to any disclaimer, the term of this patent is extended or adjusted under 35 U.S.C. 154(b) by 0 days.

(21) Appl. No.: 16/215,355

(22) Filed: Dec. 10, 2018

(65) Prior Publication Data

US 2020/0065941 A1 Feb. 27, 2020

Related U.S. Application Data

(60) Provisional application No. 62/723,035, filed on Aug. 27, 2018.

(51) Int. Cl.
| | |
|---|---|
| *G06T 5/00* | (2006.01) |
| *G06T 5/20* | (2006.01) |
| *G06T 15/50* | (2011.01) |
| *G06T 15/06* | (2011.01) |
| *G06F 3/01* | (2006.01) |

(52) U.S. Cl.
CPC ............. *G06T 5/002* (2013.01); *G06T 5/004* (2013.01); *G06T 5/20* (2013.01); *G06T 15/06* (2013.01); *G06T 15/503* (2013.01); *G06F 3/013* (2013.01); *G06T 2210/62* (2013.01)

(58) Field of Classification Search
CPC .......... G06T 5/002; G06T 5/004; G06T 5/20; G06T 15/06; G06T 15/503; G06T 2210/62; G06T 19/006; G06T 2207/10148; G06T 2207/10024; G06T 2207/10152; G06T 2207/30041; G06F 3/013
See application file for complete search history.

(56) References Cited

U.S. PATENT DOCUMENTS

| | | |
|---|---|---|
| 5,786,874 A | 7/1998 | Kawamoto et al. |
| 6,900,841 B1 | 5/2005 | Mihara |
| 8,629,868 B1 * | 1/2014 | Gardiner ............ G02B 27/0075 345/419 |
| 8,990,682 B1 | 3/2015 | Wong et al. |
| 2005/0285966 A1 | 12/2005 | Bamji et al. |
| 2006/0109417 A1 * | 5/2006 | Meier ................... G02B 25/002 351/44 |
| 2008/0200818 A1 * | 8/2008 | Determan ............ A61B 5/0064 600/476 |
| 2009/0259946 A1 | 10/2009 | Dawson et al. |
| 2012/0306906 A1 * | 12/2012 | Johnson ............... H04N 1/4072 345/591 |
| 2014/0009585 A1 | 1/2014 | Campbell et al. |

(Continued)

*Primary Examiner* — Xilin Guo
(74) *Attorney, Agent, or Firm* — Rowan TELS LLC

(57) ABSTRACT

Methods are disclosed herein to blur an image to be displayed on a stereo display (such as virtual or augmented reality displays) based on the focus and convergence of the user. The methods approximate the complex effect of chromatic aberration on focus, utilizing three (R/G/B) simple Gaussian blurs. For transparency the methods utilize buffers for levels of blur rather than depth. The methods enable real-time chromatic-based blurring effects for VR/AR displays.

18 Claims, 13 Drawing Sheets

(56) References Cited

U.S. PATENT DOCUMENTS

| | | |
|---|---|---|
| 2015/0009394 A1* | 1/2015 | Juhola .................... G03B 13/36 |
| | | 348/349 |
| 2015/0177518 A1 | 6/2015 | Wong et al. |
| 2015/0243103 A1 | 8/2015 | Schowengerdt |
| 2016/0029004 A1 | 1/2016 | Campbell et al. |
| 2016/0260245 A1* | 9/2016 | DeCell .................... G06T 15/06 |

* cited by examiner

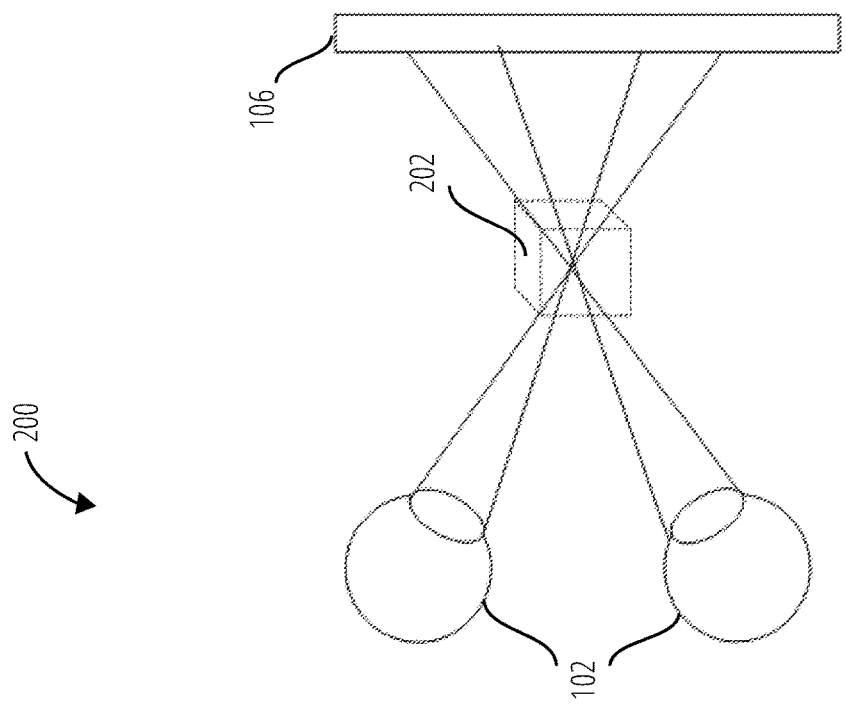
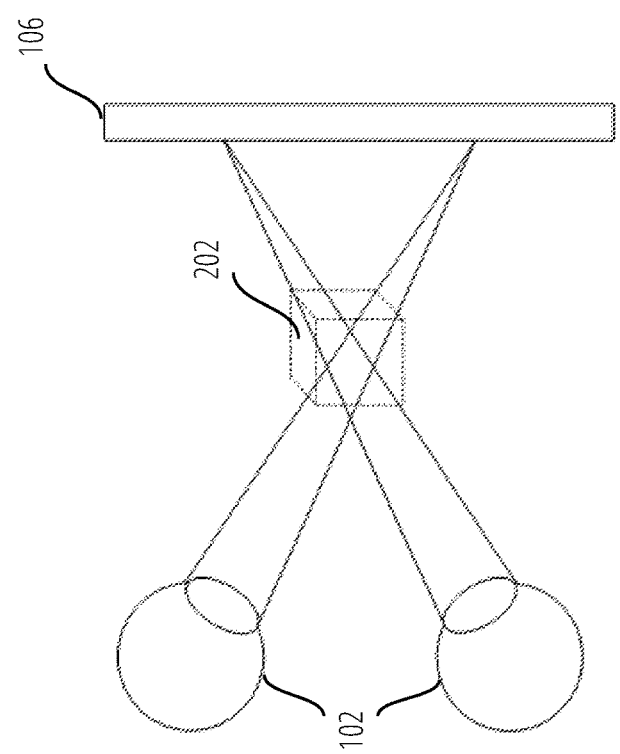
FIG. 2

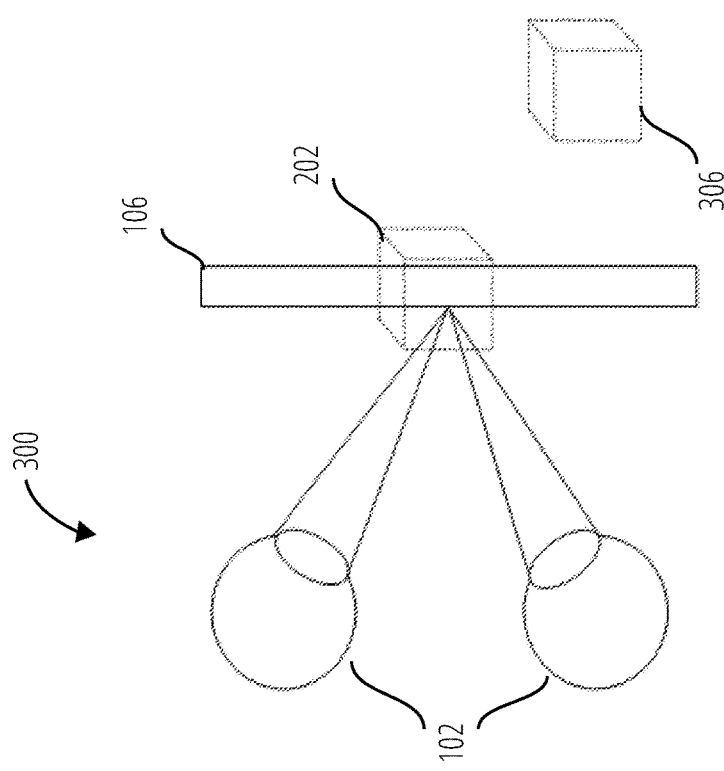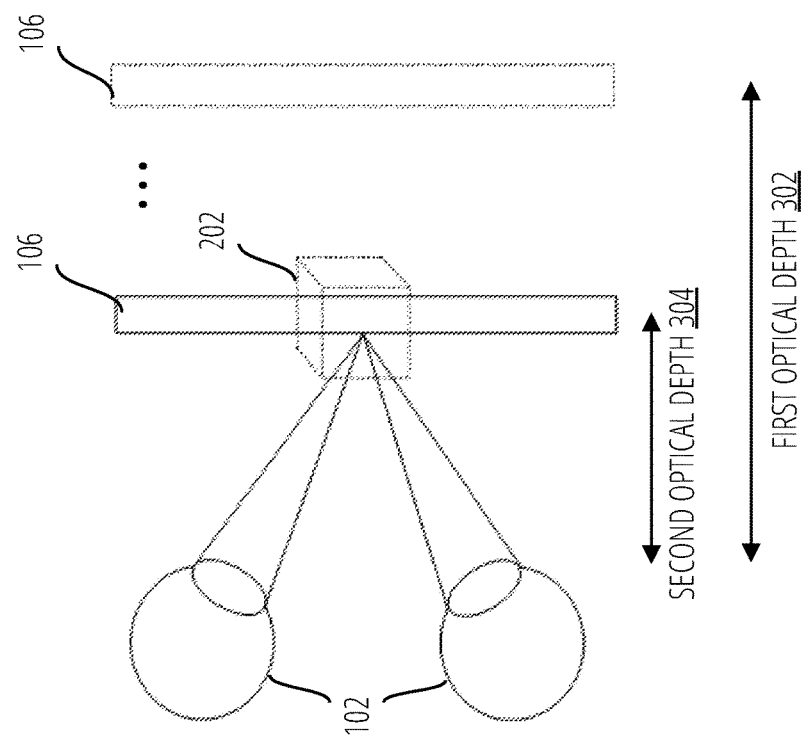
FIG. 3

COMPUTATIONAL BLUR FOR VARIFOCAL DISPLAYS

CROSS REFERENCE TO RELATED APPLICATIONS

This application claims the benefit of U.S. provisional patent application Ser. No. 62/723,035, filed on Aug. 27, 2018, the contents of which are incorporated herein by reference in their entirety.

BRIEF SUMMARY

Methods are disclosed herein to interactively provide an important depth queue (refraction chromatic aberration of human eye) missing from current VR/AR rendering algorithms ("ChromaBlur") and an algorithm to draw multiple transparent objects very quickly as is often done for AR. Varifocal is an important tech in AR and VR, and ChromaBlur is a critical cue. The AR transparency rendering algorithm is likely to be fastest for that mode of transparency.

For ChomaBlur, the methods approximate the complex effect with three (R/G/B) simple Gaussian blurs. For transparency the methods utilize buffers for levels of blur rather than depth.

The methods described herein enable real-time (e.g., millisecond response time) ChomaBlur for additive applications, such as augmented reality displays and virtual reality or desktop with additive compositing. Previous batch algorithms performed a full optimization per frame that take multiple seconds. The blur-buffer methods disclosed herein are the first to have discrete blur-width based buffers, made possible because this mode of compositing is submission order independent.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 2 illustrates an accommodation-vergence conflict 200 in accordance with one embodiment.

FIG. 3 illustrates a varifocal system 300 in accordance with one embodiment.

DETAILED DESCRIPTION

Figure 1:
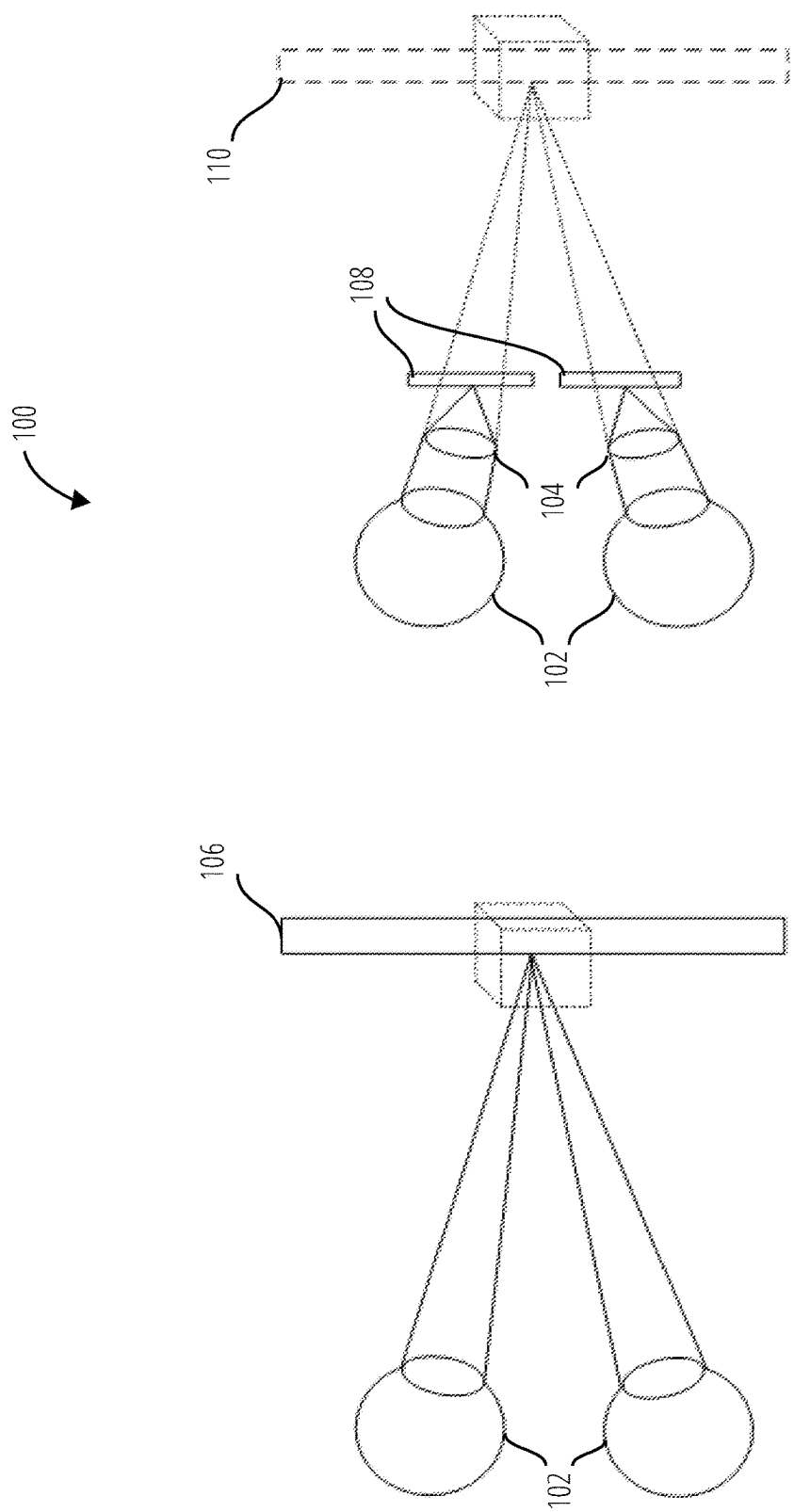
FIG. 1 illustrates traditional stereo display techniques 100 in accordance with one embodiment.

Various terminology used herein should be accorded its ordinary meaning in the arts unless otherwise indicated.

"Taps" refers to 2D point samples of nearby rendered image properties stored in a buffer.

"Hybrid field condition" refers to an object having at least one color channel that is in a different field (near-field, far-field, or in-focus) than another color channel. For example, an object for which red and green are in-focus and blue is in the near-field.

"Physical radius" refers to the radius R of the point spread function (which can be step, Gaussian, or other shape) on the retina that would be experienced in the real world.

"Graphical radius" refers to the radius R' experienced by the viewer looking at a fixed distance graphics distance.

"Blurring kernel" refers to a kernel, convolution matrix, or mask that is a small matrix utilized for blurring, sharpening, embossing, edge detection, and more by doing a convolution between a kernel and an image.

"World-space" refers to the three-dimensional space occupied by real objects in the real world.

"Screen-space" refers to the two-dimensional space of the display screen that is used to make two-dimensional images of three-dimensional virtual objects so they appear to be three-dimensional objects embedded in a three-dimensional world.

"Virtual-space" refers to the three-dimensional space assigned to virtual objects that determines how they will relate in screen-space to real world-space objects.

"Optical distance" refers to how far away the objects appear to the viewer even if their world-space distance is different; such differences are usually an intentional part of an optical design and accomplished by curved mirrors or curved refractive lenses.

"Physical distance" refers to a real-world distance between two things.

Techniques are disclosed herein to provide realistic rendering in stereo display systems, including head-mounted displays (HMDs), where the vergence (triangulation: where the two eyes are pointed) and accommodation (focus) of the eyes are not in sync with each other. That is, the viewer's eyes converge to one stereo depth, while the eyes' lenses need to be accommodated to a different depth. This issue is addressed using a varifocal display system that dynamically changes the optical depth of the display to the depth of the object the viewer is looking at, along with appropriate eye tracking and computational blurring support. Here all parts of the images are at a changeable optical distance, but always at a single distance as the eyes are accommodated to. This applies to both AR, and VR. For additive transparency AR where the graphics are an optical transparent overlay on the real world (as it is in devices such as the Microsoft HoloLens and the Meta2 headsets) there are also extra specializations that may be utilized.

Also disclosed are embodiments of a blur method for additive depth of field compositing. These methods may be applied independently of ChromaBlur, but also work with ChromaBlur for added advantage.

Conventional computer AR/VR systems display all computer graphics objects on a display (e.g., a computer monitor) at a fixed optical distance. This optical distance may be the same as the real-world object distance, such as with a computer or movie screen, or it may be changed optically by lenses such as in a typical HMD. FIG. 1 illustrates two different traditional stereo display techniques 100 (screen-based and HMD-based). The left diagram illustrates a typical stereo display system based on a traditional monitor, such as a TV or computer screen (i.e., the stereo display screen 106), where each of the eyes 102 sees a different image. The lenses of the eyes are focused at the same depth as the lines of sight are converged to. The right diagram illustrates a typical HMD system where lenses 104 focus the eyes 102 to geometrically closer screens (the focal screens 108, which are mounted on the head) that optically appear at a farther distance (the apparent display screen 110). In both techniques there are no cue conflicts as long as the virtual objects are at the same virtual distance as the real screen (left) or optical depth (right).

When the virtual object is at the same optical distance from the viewer as the screen, viewing is naturalistic, meaning that the eyes 102 are focused at the same distance that the lines of sight converge, and the screen displays an image at that location which is in focus, resulting in a comfortable natural situation. However, when the virtual object is not at the screen distance, the lines of sight converge appropriately but either the eyes 102 must focus at the stereo display screen 106 (where the virtual object is sharp), or they must focus at the distance of the virtual object in which case they will not be focused on the stereo display screen 106. In the latter case the virtual object will be blurry (see FIG. 2). This is the "accommodation-vergence conflict" that is believed to cause user discomfort.

FIG. 2 illustrates accommodation-vergence conflict 200. In the left diagram, the lines of sight are appropriately converged on the virtual object 202, but the eyes 102 are focused behind the virtual object 202 on the stereo display screen 106. This results in the virtual object 202 being in focus for the user. In the right diagram, the eyes 102 are focused on the virtual object 202 causing its image on the stereo display screen 106 to appear blurry.

FIG. 3 illustrates a varifocal system 300 to address the problem of accommodation-vergence conflict 200, where the optical distance to the virtual object 202 is not the same as the stereo (triangulation) distance to the virtual object 202. In the varifocal system 300 the optical depth of the stereo display screen 106 is dynamically changed to be at the distance at which the eyes 102 are focused at (i.e., from the first optical depth 302 to the second optical depth 304). However, this creates an experience in which all objects are in focus, even if to a viewer in the real world some objects (e.g., adjacent virtual object 306) would be blurred because they are at a different optical depth than the stereo display screen 106.

Existing varifocal systems change the distance to the virtual objects either by moving the lenses or image sources, or by dynamically changing the focal length of the optical system by physically changing the curvature of the optical components.

The left diagram of FIG. 3 illustrates a varifocal system that moves the optical depth of the stereo display screen 106 dynamically to maintain the stereo display screen 106 at the distance the eyes 102 are focused at (i.e., from the first optical depth 302 to the second optical depth 304). The right diagram illustrates the same system with an adjacent (in the viewer's visual field) object (the adjacent virtual object 306) that should be blurry to the viewer, but for which the image is displayed in sharp focus.

Figure 4:
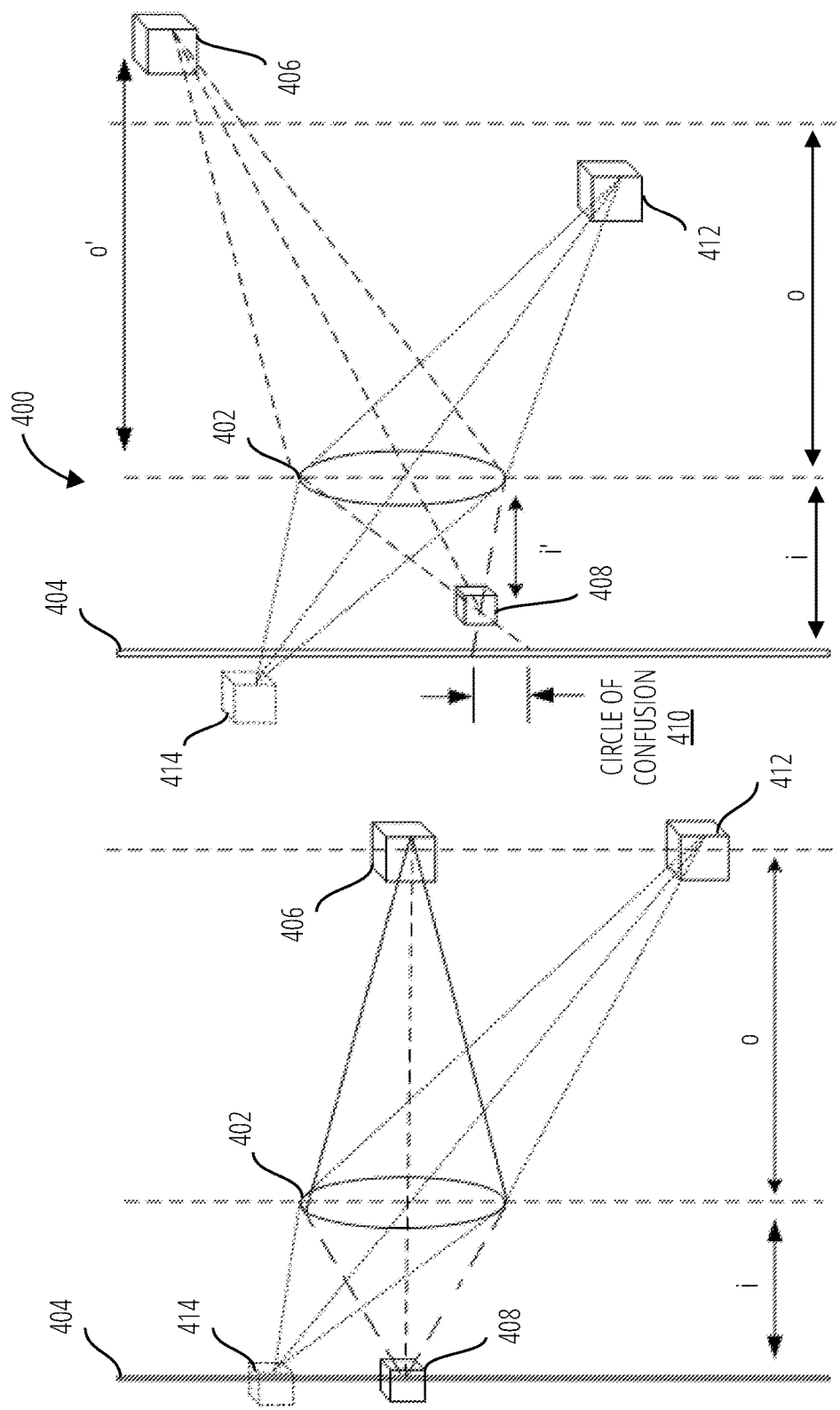
FIG. 4 illustrates a thin lens model 400 in accordance with one embodiment.

FIG. 4 illustrates a thin lens model 400. When viewing objects in the real world, only objects at a certain distance are projected in sharp focus on the retina, and objects at other distances are blurred. The same is true of cameras, and the resulting objects with blur are said to have "depth of field". This effect may be simulated in computer graphics, and is often implemented using brute-force ray tracing with an underlying "thin-lens camera" model for image formation.

The thin-lens model obeys the "thin lens equation" $1/f=1/i+1/o$ where f is the "focal length", an intrinsic property of the lens 402, i is the distance between the lens 402 and the focal plane 404 (e.g., the retina in a human eye or the film/sensor in a camera), and o is the distance to the first object 406 being imaged (the first image 408 in the left side illustration in FIG. 4). The geometric implication of this law is that light leaving an object at distance o converges at distance i on the other side of the lens 402. When the focal plane 404 is at the distance i then the first image 408 of the first object 406 is in focus. When the focal plane 404 is not at distance i, the first image 408 is blurred and the area of that blur on the focal plane 404 is the circle of confusion 410. This can arise when the first object 406 is either father or closer than o (e.g., see the right side illustration in FIG. 4). To adjust the focus most cameras move the lens 402 closer or farther from the focal plane 404. Humans deform the lens of their eyes to change the focal length f.

In the left side illustration of FIG. 4, two objects (the first object 406 and the second object 412) are both at a depth o, and the focal plane 404 is located such that the thin lens equation is satisfied (i.e., $1/i+1/o=1/f$ for the focal length of the lens 402. All objects at depth o are projected to in-focus images (the first image 408 and second image 414) in this scenario.

In the right side illustration of FIG. 4, an object closer than o (the second object 412) will project an image to a point behind the focal plane 404 and will form a blurred projection on the focal plane 404 (i.e., the second image 414). An object farther away that o (the first object 406) will project an image in front of the focal plane 404 and will also form a blurred projection (i.e., the first image 408) on the focal plane 404. The thin lens equation for the first object 406 is satisfied by $1/o'+1/i'=1/f$, thus if the focal plane 404 is moved to distance o' from the lens 402, the first object 406 will project an in-focus image and the second image 414 of the second object 412 will appear even more blurred. The blur for each point (the "point spread function") is a disk called the circle of confusion 410.

The circle of confusion 410 may be rendered to the viewer using computational blur techniques, either by simulating the rays that form the image using a Monte Carlo distribution ray tracer, or approximated interactively by blurring points as they are projected to the screen. These techniques often utilize a Gaussian point spread function rather than a disk, and in those cases the standard deviation applied to the Gaussian point spread function is about half the radius of the aperture of the camera or eye, which approximates the blur of edges. In other words, the Gaussian point spread function is determined by mean and standard deviation parameters in which the standard deviation parameter is computed from the radius parameter of the circle of confusion 410 and the mean is zero.

Figure 5:
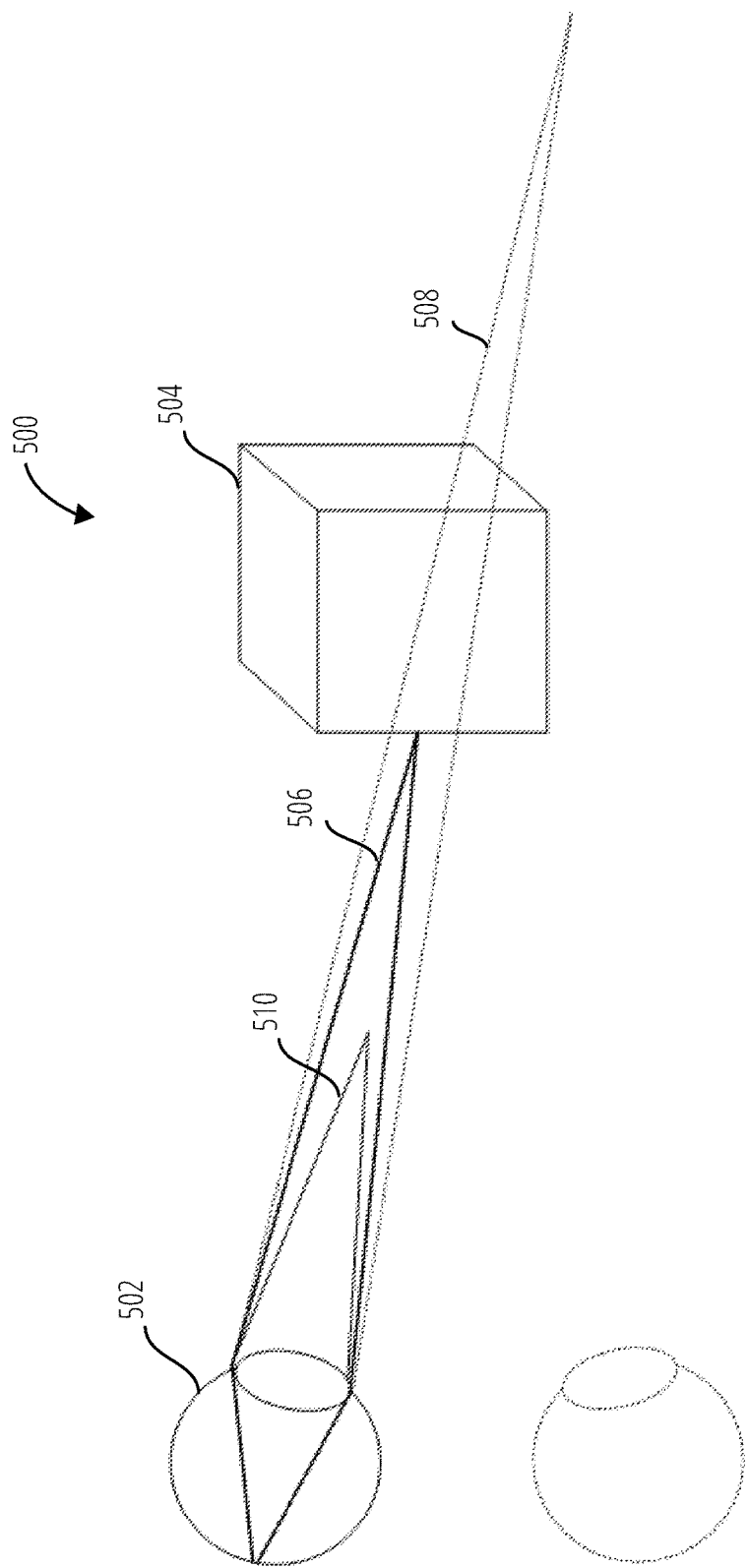
FIG. 5 illustrates a ChromaBlur 500 in accordance with one embodiment.

FIG. 5 illustrates the ChromaBlur 500 phenomenon. An aspect of the blurring of the image of an object 504 on the retina of the eye 502 is that the amount of blur depends both on distance from the lens of the eye 502 to the object 504 and the wavelength of the light. In other words, the lens of the human eye has significant chromatic aberration. Recently it has been shown that chromatic aberration patterns are important focusing mechanisms for the human eye.

The effects of ChromaBlur 500 may be accounted for in a computational blurring algorithm in a varifocal system. When the human eye 502 is focused on an object 504 at a certain distance it is actually only the green wavelengths 506 of light received from the object 504 from that distance that are in focus. Red objects at a farther distance are in focus, and blue objects at a closer distance are in focus. For the object 504 having green wavelengths 506 in focus, the red wavelengths 508 and the blue wavelengths 510 both generate circles of confusion on the retina. When the object 504 blue hues are not blurry it means the eye 502 is focused past the object 504. When object 504 red hues are not blurry the user is focused too close.

In one embodiment, a ChromaBlur algorithm is applied to compute the red and blue focal distances to an object based on where the green wavelengths are in focus. Human viewers tend to manifest chromatic aberration given by the formula:

$$\Delta D(\lambda) = 1.713 - \frac{633.46}{\lambda - 214.1} \qquad \text{Equation 1}$$

Here D is the diopter (1/f) of the focal distance f for the human eye. Let the three wavelengths associated with the three RGB (red, green, and blue) components be represented by D_green, D_blue, and D_red. If D_green is known, D_blue and D_red may be computed, and the distances at which D_red and D_blue appear in focus ($o_r$ and $o_b$, respectively, for the thin lens equation) may also be computed from the distance that green appears in focus ($o_g$).

Assume that the thin lens equation applies, and that the diopter of the lens D=1/f changes by an amount delta D. This yields, for red:

$$1/o_r - 1/o_g = \Delta D(\lambda_r) - \Delta D(\lambda_g) \qquad \text{Equation 2}$$

The computation of $o_b$ may be made in similar fashion. Equation 2 enables the use of distances at which each of red, green, and blue wavelengths are in focus to be utilized in computational blur algorithms. However, for many configurations the distance $o_r$ computes to be negative and conventional computational blur algorithms are unsuitable.

One aspect of the invention solves for this negative $o_r$ case for both Monte Carlo ray tracing and real-time screen space algorithms. The optical interpretation of a negative object distance is that there is no point of the object in focus, and rays in divergent directions from the object are projected to form an image at a distance $o_r$ behind the thin lens 602.

For a Monte Carlo ray tracing algorithm this is implemented by choosing a random point 604 on the thin lens 602 (as is done by previous methods) and having the ray origin be a deterministic point along a line through both the lens center 608 and the convergence point for the green rays.

Figure 6:
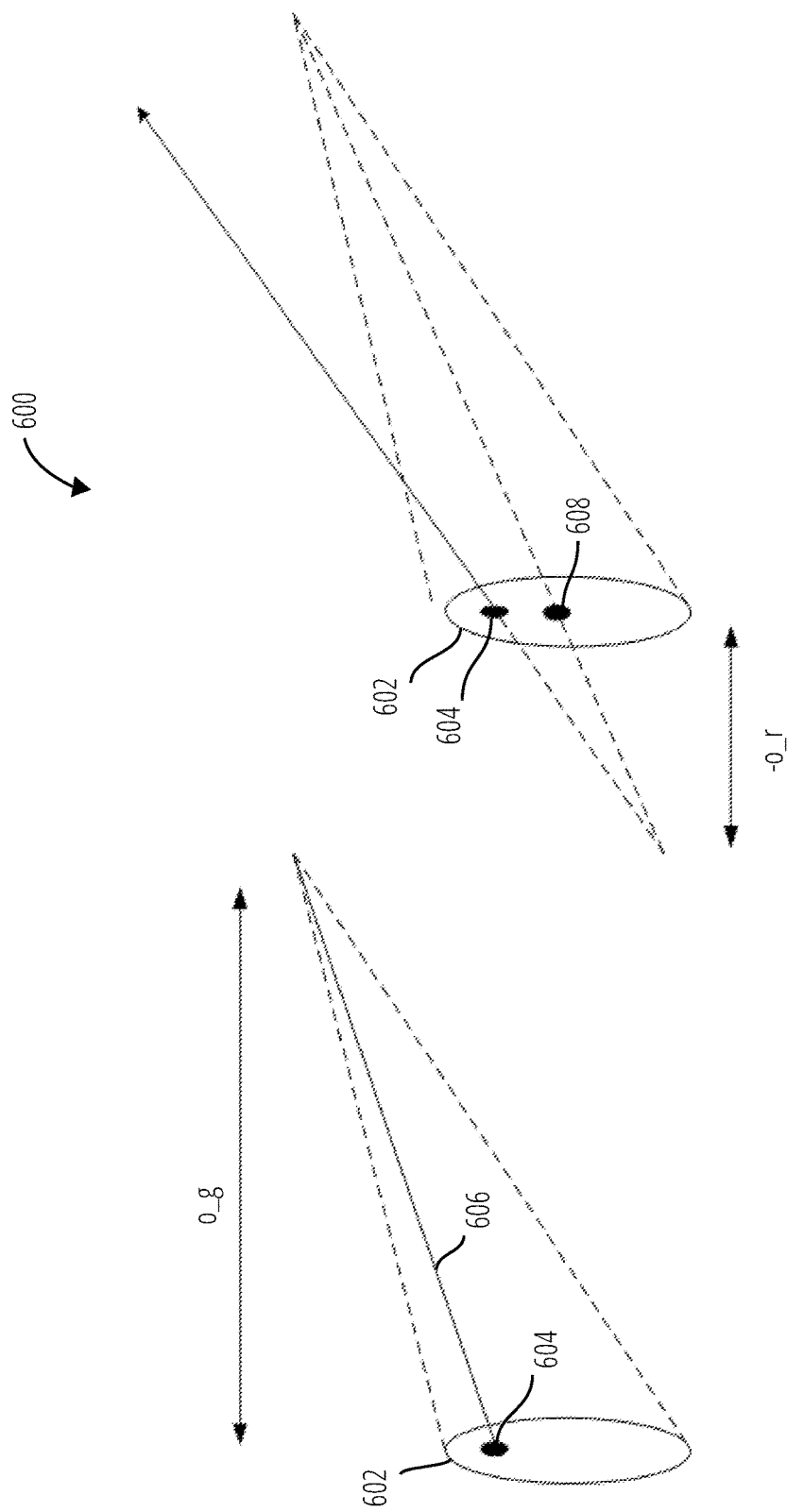
FIG. 6 illustrates a Monte Carlo ray tracing 600 in accordance with one embodiment.

Referring to the left side of the Monte Carlo ray tracing 600 of FIG. 6, conventional Monte Carlo ray tracing 600 chooses a random point 604 for the ray origin on the area of the thin lens 602 and casts a ray 606 toward the point of convergence on the object plane.

When computing chromatic aberration of the thin lens 602 there may be no object plane in front of the thin lens 602, and therefore the method disclosed herein chooses a point behind the thin lens 602 at a distance $-o_r$ ($-o_r$ in FIG. 6) to set a ray casting direction.

For a screen-space computational blur algorithm a new technique is thus needed to compute the circle of confusion for $-o_r$ values. Realtime computational blur for depth of field is accomplished by blurring each object rendered in screen-space based on its depth, accounting for the partial transparency of objects in front of other objects. For a lens of diameter A at the viewpoint (z=0), and a distance z=d to where objects are in focus, the diameter C of the circle of confusion (in world-space) for a rendered point at distance z is given by:

$$C = A|z-d|/d \qquad \text{Equation 3}$$

For the case where the point of origin for a ray is behind the lens, this formula can still be applied to choose the world-space circle of confusion.

A Method for Choosing the Appropriate Blurring Kernel

Figure 7:
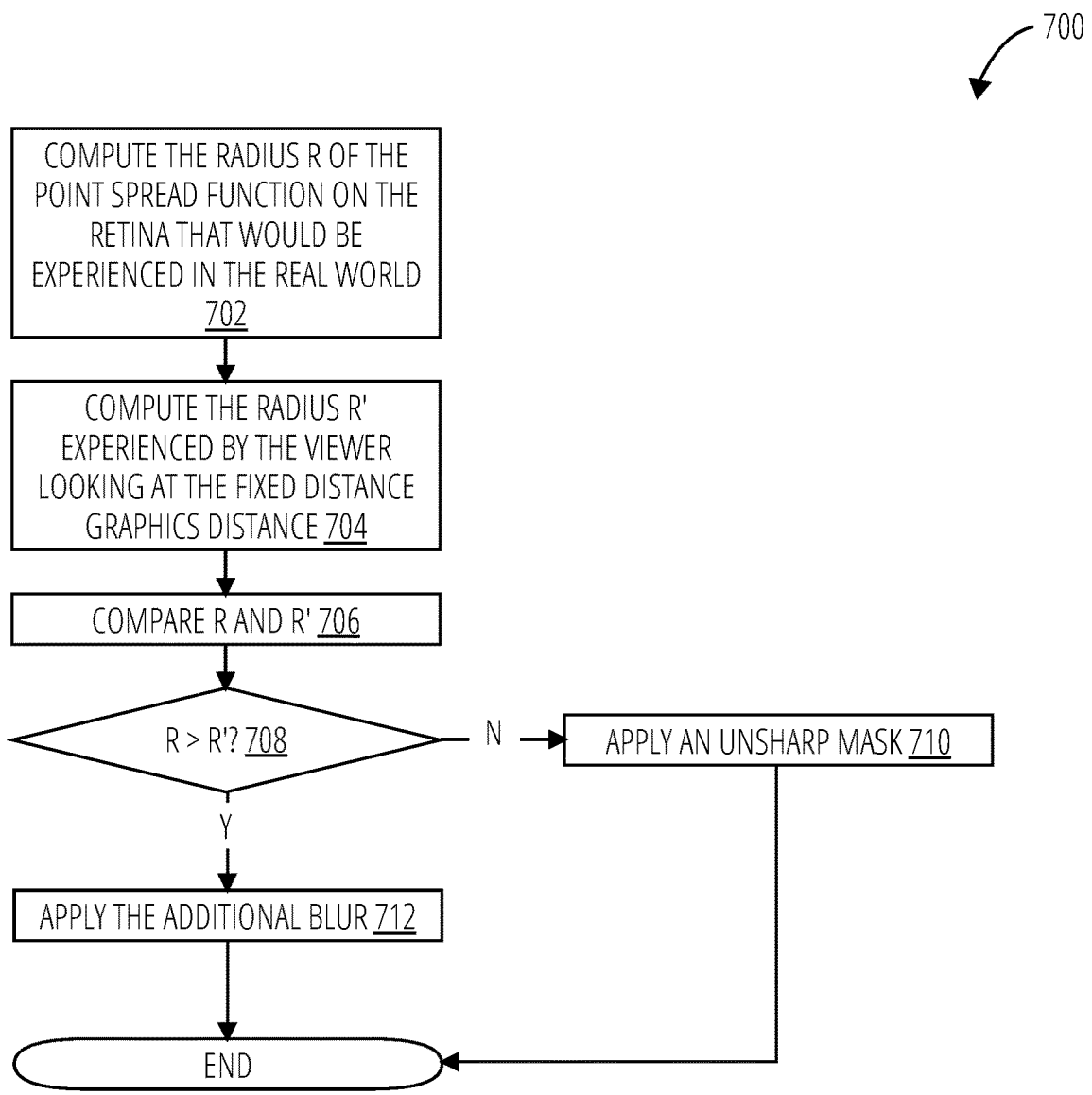
FIG. 7 illustrates a blur kernel selection method 700 in accordance with one embodiment.

Referring to FIG. 7, an embodiment of a blur kernel selection method 700 that may be implemented on computational blurring logic in an AR/VR display system selects a depth-dependent blurring kernel (point spread function) to be utilized by a screen space computational blur algorithm. For each color channel, the blur kernel selection method 700 computes the radius R of the point spread function (which may be step, Gaussian, or other shape) on the retina that would be experienced in the real world (block 702). The blur kernel selection method 700 further computes the radius R' experienced by the viewer looking at the fixed optical distance (block 704). This refers to the optical distance to the screen, not the physical distance between the eye and the screen, and not the virtual distance to the object in virtual-space. R and R' are then compared (block 706). When R>R' (decision block 708), there is insufficient blurring and the method applies additional blur (block 712) with radius:

$$R'' = \text{sqrt}(R*R - R'*R') \qquad \text{Equation 4}$$

Equation 4 is exact when two sequential Gaussian blurs produce the same result as a single, wider Gaussian blur. When R<R' (decision block 708), there may be too much blur from the optical system. In that case, the image may be sharpened more than its original appearance. The blur kernel selection method 700 may apply an unsharp mask (block 710) to give the best real-world result in these conditions by:

$$\text{Image\_unsharp} = K*\text{Image} - (K-1)*\text{Image\_blurred\_by\_filter} \qquad \text{Equation 5}$$

Where Image_unsharp is the representation of the virtual object with the unsharp mask applied, intended for display, Image is the original representation of the virtual object, and Image_blurred_by_filter is the virtual object processed with the blur kernel computed in and radius in block 702 and block 704.

For Gaussian blur functions, the minimum L2 error (the average squared distance between the input function and the function blurred with the blurring kernel) may be achieved when K=2, and the radius (standard deviation) of the Gaussian is set by:

$$R_{gauss} = 0.7*\text{sqrt}(R'*R' - R*R) \qquad \text{Equation 6}$$

Figure 8:
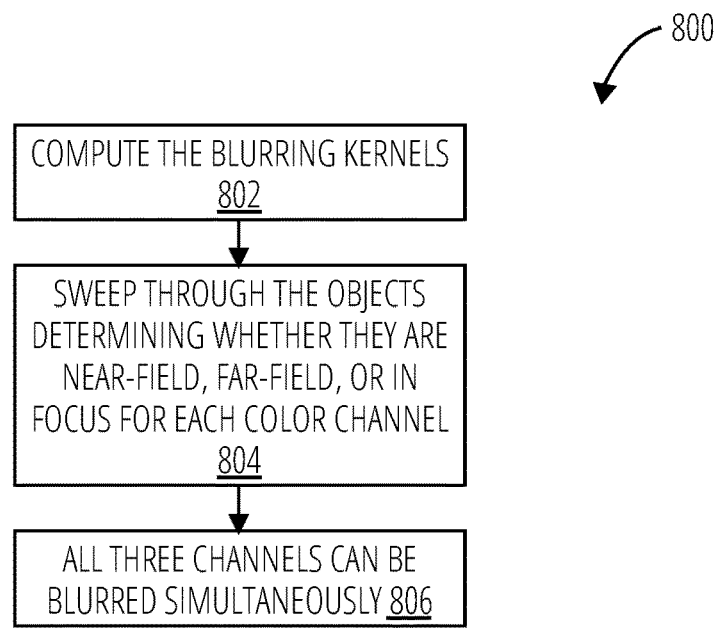
FIG. 8 illustrates a three-channel computational blur algorithm 800 in accordance with one embodiment.

A Three-Zone Method for Applying a Screen Space Computational Blur Algorithm for Opaque Scenes For a conventional rendering of occluding, all-opaque objects that produce a final luminance buffer and depth buffer, there exist algorithms for single channel computational blur. An embodiment of a three-channel computational blur algorithm 800 is shown in FIG. 8 that incorporates ChromaBlur into these algorithms 700 and may be implemented on computational blurring logic in an AR/VR display system. The three-channel computational blur algorithm 800 may be utilized for VR and for pass-through video AR. Transparent objects are not addressed by this method.

Referring to FIG. 8, at block 802 the three-channel computational blur algorithm 800 first computes the blurring kernels using the previously described methods, e.g., the blur kernel selection method 700 and Monte Carlo ray tracing 600. At block 804, the method sweeps through the objects determining whether they are near-field, far-field, or in-focus field for each color channel (each channel has a different degree of blur). A majority of objects will be in the near or far field, and all three channels may be blurred simultaneously, e.g., via parallel computer processing (block 806). Objects in a hybrid condition (occupying two or more fields of focus) may be handled on a color-channel by color-channel basis.

Figure 9:
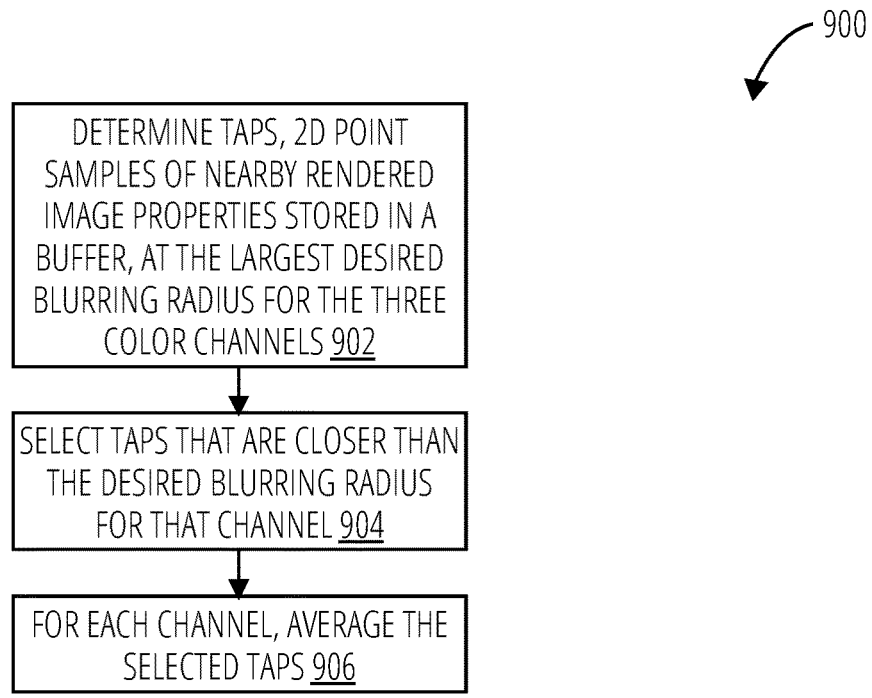
FIG. 9 illustrates a tap-based method 900 in accordance with one embodiment.

A Tap-Based Method for Applying a Screen Space Computational Blur Algorithm for Opaque Scenes Another family of real-time computational blur algorithms that may be implemented on computational blurring logic in an AR/VR display system uses "taps" (2D point samples of nearby rendered image properties stored in a buffer) to average nearby colors. Referring to FIG. 9, a ChromaBlur effect may be applied by sampling taps at the largest desired blurring radius for the three color channels (block 902), selecting only those taps that are closer than the desired blurring radius for that channel (block 904), and, for each channel, averaging those selected taps (block 906). The tap-based method 900 may utilize the Monte Carlo ray tracing 600 and the blur kernel selection method 700 to determine the largest desired blurring radius for each of the three color channels.

A Method for Blurring into Scale Categories for Additive Displays

Figure 10:
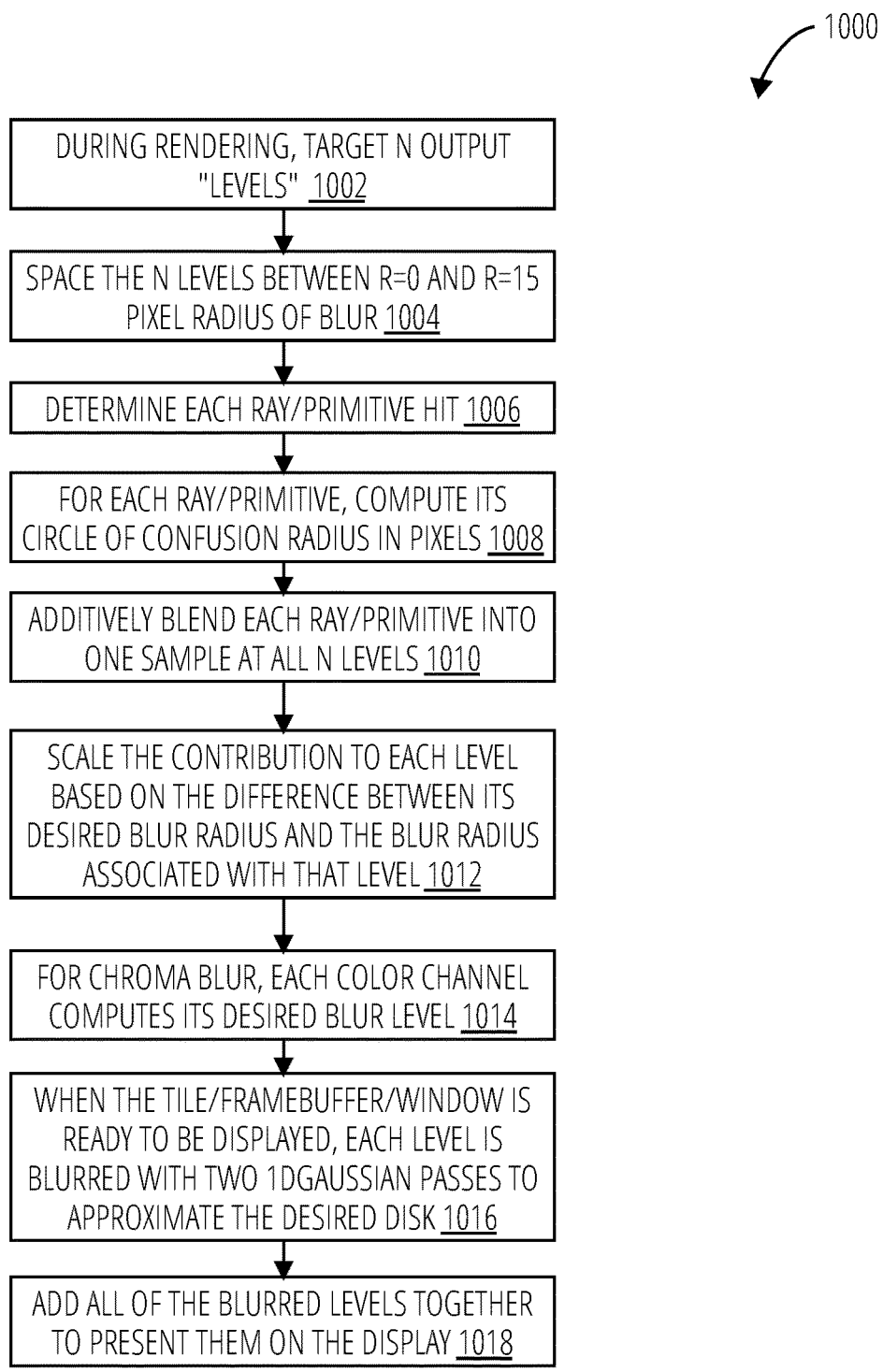
FIG. 10 illustrates a scale categories blurring method 1000 in accordance with one embodiment.

An embodiment of a scale categories blurring method 1000 as illustrated in FIG. 10 may be implemented using computational blurring logic. The scale categories blurring method 1000 assumes that the content being rendered is additively blended over the world and that different 3D objects are additively blended over each other. These constraints enable certain efficiencies that the opaque case does not. Additive blending is a term of art that means the luminance values from different depths are summed together, instead of the closer object occluding the further one. It creates an effect similar to "3D projections" in movies. For example additive blending within the well-known OpenGL framework is implemented by the operations glBlendFunc (GL_ONE, GL_ONE) and glBlendEquation (GL_FUNC_ADD). Additive blending has the computational advantage that object compositing is order independent, avoiding the need for sorting or approximating, as well as avoiding the associated per-pixel storage.

Additive blending also simplifies the process of depth-of-field rendering, because occlusion boundaries are what make depth of field complex to approximate with high quality in real-time, which affects performance due to increasingly complex approximations necessary to set the desired quality.

Referring to FIG. 10, the scale categories blurring method 1000, during rendering, targets N output "levels" (block 1002). These levels are not necessarily depth layers, but may be framebuffer tiles, sliding windows, entire framebuffers, etc. In one embodiment, N=4. Each level may correspond to a varying level of blurriness (again, not depth). One embodiment spaces levels linearly between a pixel blur radius of r=0 and r=15, although a non-linear spacing may also be utilized (block 1004).

Each ray hit, which is the screen position and distance to an object, is determined (block 1006), and the object's circle of confusion radius is computed in pixels (block 1008). The ray color is additively blended into one pixel at all N levels (block 1010). The blur radius for each channel can be different and, in that case, each channel is processed independently. A blur radius is likely to fall between two of the blur radii associated with two discrete levels. In this case, the contribution is divided with between the two levels, with the contributions being scaled to sum to a given value, e.g., to one (block 1012).

For ChromaBlur (e.g., the Monte Carlo ray tracing 600), the desired blur level for each color channel is determined independently (block 1014). However, although independent of one another, the desired blur levels for the color channels may be computed and applied simultaneously. Thus, the use of the scale categories blurring method 1000 to add ChromaBlur to existing algorithms incurs minor additional computational complexity.

When the tile, framebuffer, window, or other image area is ready to be displayed, each level is blurred with two 1D Gaussian passes to approximate the desired circle of confusion, i.e., the desired blur radius (block 1016). The Gaussian standard deviation may approximate R/2. The scale categories blurring method 1000 then adds all of the blurred levels together to present them on the display (block 1018).

Traditional computational blurring algorithms determine a blur radius for each rendered 3D point based on its depth. When additive transparency is applied, as it often is in AR systems, the points may be rendered and composited independently, in any order (depth independent). In the novel disclosed approach, all points with the same blurring radius are grouped regardless of depth because depth ordering doesn't matter, and they are blurred together in one buffer rather than blurring each point individually. There are infinite blurring radii in practice for a scene of continuous depth, and thus the points to render are first collected into discrete sets of blurring radii. This technique takes advantage of the fact that human vision cannot precisely determine how blurred a point is.

A Method for Computational Blur Using Computation Neural Networks

Figure 11:
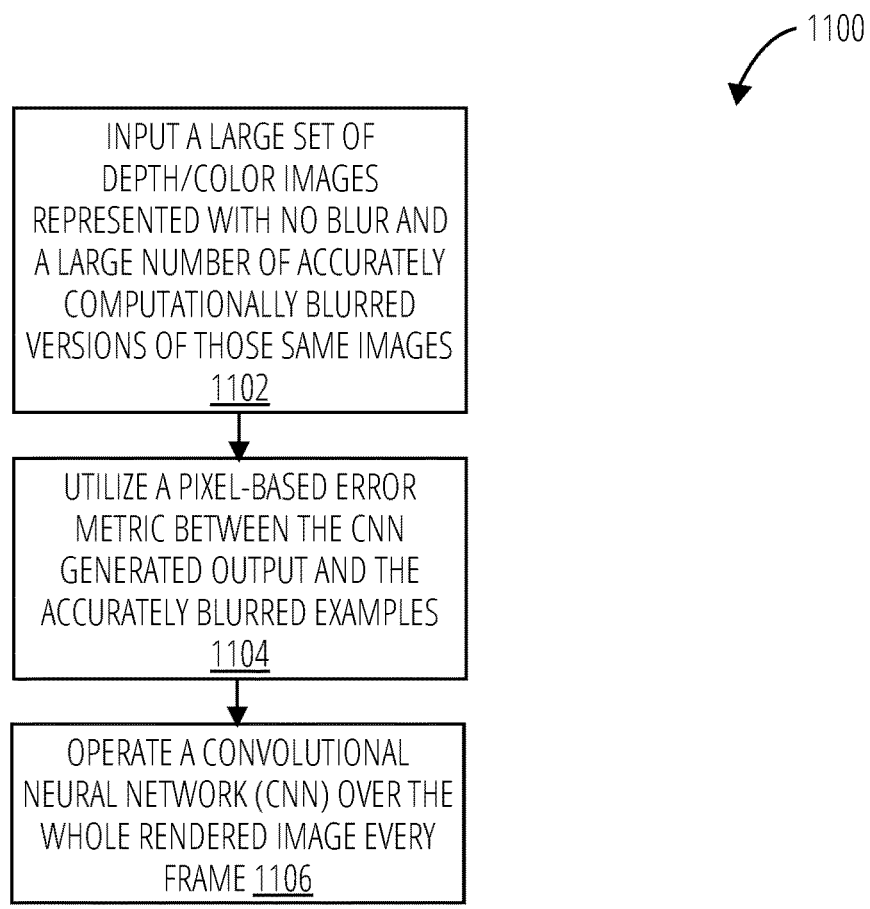
FIG. 11 illustrates a CNN computational blur method 1100 in accordance with one embodiment.

In some implementations of VR or AR, there may already be a convolutional neural network (CNN) analyzing the entire rendered image for every frame, for example, as a post-processor for effects such as de-noising. For this reason and others, it may be preferable to use a CNN to develop an empirically optimized computational blur that that is either conventional or includes ChromaBlur effects. Referring to FIG. 11, to train such a network, a CNN computational blur method 1100 utilizes a large set of images represented with no blur and a large number of accurately computationally-blurred versions of those same images (block 1102). The CNN is trained using a pixel-based error metric between the CNN-generated output and the accurately blurred examples (block 1104). The trained CNN is then operated over the whole rendered image for every frame (block 1106). The CNN may be incorporated into, incorporate, or accompany the computational blurring logic disclosed herein.

A Method for a Complete Varifocal Head-Mounted Display System

The computational blur methods described herein may be combined with a varifocal head-mounted stereo display and an eye tracking system to create a comfortable user experience unavailable on current head mounted systems.

The system may be integrated with an accommodation tracking system such as one based on an auto-refractor. This allows the computational blur system to use directly-measured accommodation rather than accommodation inferred from convergence or other data. The system may also be extended to multi-plane varifocal systems where less aggressive computational blurring is needed.

Figure 12:
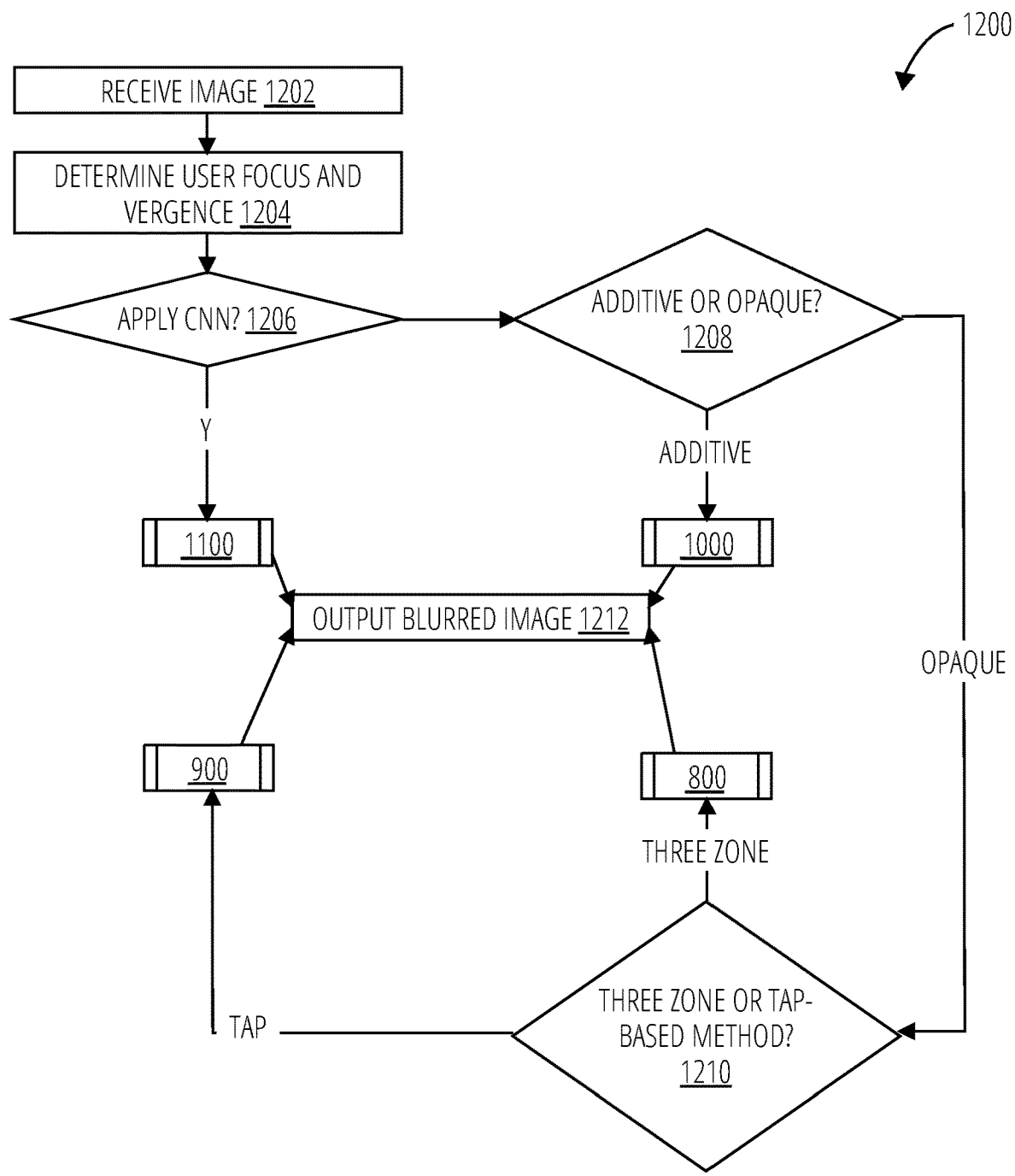
FIG. 12 illustrates a varifocal head-mounted display system method 1200 in accordance with one embodiment.

Referring to FIG. 12, a varifocal head-mounted display system method 1200 receives an image (block 1202). The user focus and convergence are then determined (block 1204). The varifocal head-mounted display system method 1200 determines whether a CNN is operating (decision block 1206). If so, the CNN computational blur method 1100 is utilized to output a blurred image (block 1212). If not, the varifocal head-mounted display system method 1200 determines whether an additive or opaque method is to be utilized.

If an additive technique is to be utilized (decision block 1208), the scale categories blurring method 1000 is utilized to output a blurred image (block 1212). If an opaque technique is to be utilized (decision block 1208), the varifocal head-mounted display system method 1200 selects between the three-channel computational blur algorithm 800 and the tap-based method 900 (decision block 1210) to output a blurred image (block 1212). Each method may utilize the Monte Carlo ray tracing 600 and the blur kernel selection method 700 during operation, the varifocal head-mounted display system method 1200 selectively applying each.

Figure 13:
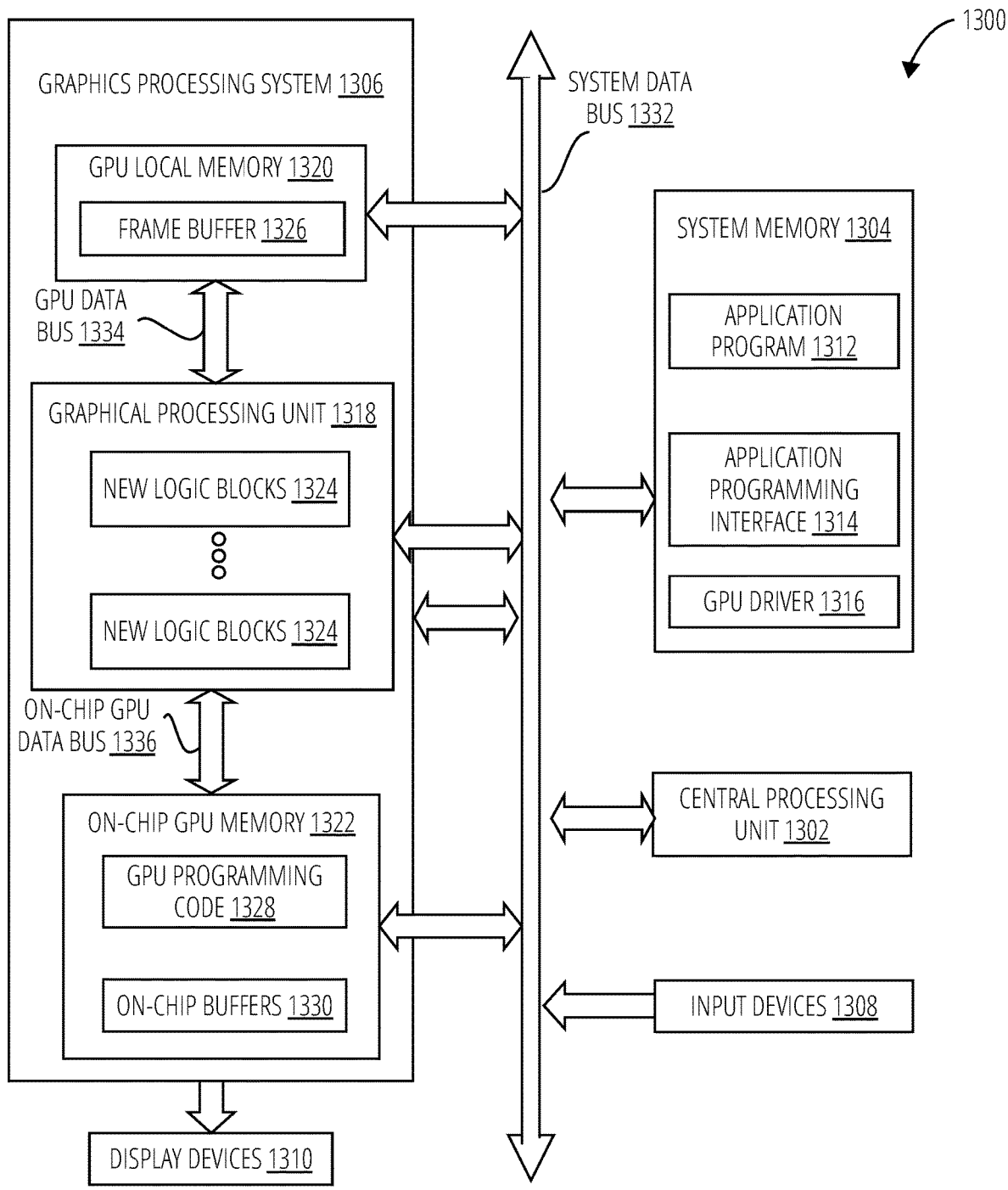
FIG. 13 is a block diagram of a computing system 1300 within which the GPU or method introduced herein may be embodied or carried out.

FIG. 13 is a block diagram of one embodiment of a computing system 1300 in which one or more aspects of the invention may be implemented. The computing system 1300 includes a system data bus 1332, a CPU 1302, input devices 1308, a system memory 1304, a graphics processing system 1306, and display devices 1310. In alternate embodiments, the CPU 1302, portions of the graphics processing system 1306, the system data bus 1332, or any combination thereof, may be integrated into a single processing unit. Further, the functionality of the graphics processing system 1306 may be included in a chipset or in some other type of special purpose processing unit or co-processor.

As shown, the system data bus 1332 connects the CPU 1302, the input devices 1308, the system memory 1304, and the graphics processing system 1306. In alternate embodiments, the system memory 1304 may connect directly to the CPU 1302. The CPU 1302 receives user input from the input devices 1308, executes programming instructions stored in the system memory 1304, operates on data stored in the system memory 1304, and configures the graphics processing system 1306 to perform specific tasks in the graphics pipeline. The system memory 1304 typically includes dynamic random-access memory (DRAM) employed to store programming instructions and data for processing by the CPU 1302 and the graphics processing system 1306. The graphics processing system 1306 receives instructions transmitted by the CPU 1302 and processes the instructions to render and display graphics images on the display devices 1310.

As also shown, the system memory 1304 includes an application program 1312, an API 1314 (application programming interface), and a graphics processing unit driver 1316 (GPU driver). The application program 1312 generates calls to the API 1314 to produce a desired set of results, typically in the form of a sequence of graphics images. The application program 1312 also transmits zero or more high-level shading programs to the API 1314 for processing within the graphics processing unit driver 1316. The high-level shading programs are typically source code text of high-level programming instructions that are designed to operate on one or more shading engines within the graphics processing system 1306. The API 1314 functionality is typically implemented within the graphics processing unit driver 1316. The graphics processing unit driver 1316 is configured to translate the high-level shading programs into machine code shading programs that are typically optimized for a specific type of shading engine (e.g., vertex, geometry, or fragment).

The graphics processing system 1306 includes a GPU 1318 (graphics processing unit), an on-chip GPU memory 1322, an on-chip GPU data bus 1336, a GPU local memory 1320, and a GPU data bus 1334. The GPU 1318 is configured to communicate with the on-chip GPU memory 1322 via the on-chip GPU data bus 1336 and with the GPU local memory 1320 via the GPU data bus 1334. The GPU 1318 may receive instructions transmitted by the CPU 1302, process the instructions to render graphics data and images, and store these images in the GPU local memory 1320. Subsequently, the GPU 1318 may display certain graphics images stored in the GPU local memory 1320 on the display devices 1310.

The GPU 1318 includes one or more new logic blocks 1324. The operation of the new logic blocks 1324 is described more fully in conjunction with the previous figures.

The GPU 1318 may be provided with any amount of on-chip GPU memory 1322 and GPU local memory 1320, including none, and may employ on-chip GPU memory 1322, GPU local memory 1320, and system memory 1304 in any combination for memory operations.

The on-chip GPU memory 1322 is configured to include GPU programming 1328 and on-Chip Buffers 1330. The GPU programming 1328 may be transmitted from the graphics processing unit driver 1316 to the on-chip GPU memory 1322 via the system data bus 1332. The GPU programming 1328 may include a machine code vertex shading program, a machine code geometry shading program, a machine code fragment shading program, or any number of variations of each. The on-Chip Buffers 1330 are typically employed to store shading data that requires fast access to reduce the latency of the shading engines in the graphics pipeline. Because the on-chip GPU memory 1322 takes up valuable die area, it is relatively expensive.

The GPU local memory 1320 typically includes less expensive off-chip dynamic random access memory (DRAM) and is also employed to store data and programming employed by the GPU 1318. As shown, the GPU local memory 1320 includes a frame buffer 1326. The frame buffer 1326 stores data for at least one two-dimensional surface that may be employed to drive the display devices 1310. Furthermore, the frame buffer 1326 may include more than one two-dimensional surface so that the GPU 1318 can render to one two-dimensional surface while a second two-dimensional surface is employed to drive the display devices 1310.

The display devices 1310 are one or more output devices capable of emitting a visual image corresponding to an input data signal. For example, a display device may be built using a cathode ray tube (CRT) monitor, a liquid crystal display, or any other suitable display system. The input data signals to the display devices 1310 are typically generated by scanning out the contents of one or more frames of image data that is stored in the frame buffer 1326.

Additional Terminology and Interpretation

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Software" in this context refers to logic implemented as processor-executable instructions in a machine memory (e.g. read/write volatile or nonvolatile memory or media).

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

What is claimed is:

1. A system comprising:
    a display to render a plurality of virtual objects;
    a lens comprising a diameter A and a viewpoint at z=0;
    computational blurring logic adapted to compute a red focal distance and a blue focal distance to each virtual object based on a green focal distance z=d from the lens to the virtual object, and to blur the virtual object on the display based on a blur radius for each of the red focal distance, blue focal distance, and a-green focal distance; and
    wherein a diameter C of the blur radius in world-space for a virtual object at distance z is determined by:

$C = A|z \times d|/d.$

2. The system of claim 1 wherein the computational blurring logic is further adapted to:
    utilize a Monte Carlo ray tracing algorithm; and
    utilize a point behind the thin lens model at the red focal distance to set a ray casting direction for the Monte Carlo ray tracing algorithm.

3. The system of claim 2 wherein the computational blurring logic is further adapted to:
    scan N levels of a scene comprising the virtual objects, each of the N levels associated with a degree of blurriness to apply to virtual objects in the level, wherein the degree varies from level to level;
    apply the Monte Carlo ray tracing algorithm for each virtual object at each of the N levels;
    compute a blur radius for each virtual object at each of the N levels based on the varying degree of blurriness to apply for the level;
    additively blend each ray of the Monte Carlo ray tracing algorithm for each of the N levels into one rendered pixel; and
    scale a contribution of each ray based on a difference between a desired blur radius for the level and a configured blur radius for the level.

4. The system of claim 3 wherein the computational blurring logic is further adapted to compute a blur radius for each color channel of the virtual object independently of a blur radius for the other color channels of the virtual object, and computes the blur radius for each color channel in parallel.

5. The system of claim 3 wherein N=4.

6. The system of claim 3 wherein levels are spaced linearly between a blur radius of r=0 and r=15.

7. The system of claim 3 wherein levels may be depth levels, framebuffer tiles, sliding windows, or entire framebuffers.

8. The system of claim 3 wherein the computational blurring logic is further adapted to blur each level with two 1D Gaussian passes to approximate the desired blur radius.

9. The system of claim 8 wherein a Gaussian standard deviation for the 1D Gaussian passes approximates R/2.

10. The system of claim 1 wherein the computational blurring logic is further adapted to dynamically select a screen-space depth-dependent blurring kernel for the virtual object.

11. The system of claim 10 wherein for each color channel of the virtual object, the computational blurring logic is adapted to:
    determine a radius R of a real-world point spread function that would be experienced by a viewer;
    determine a radius R' of the point spread function that would be experienced by the viewer at a fixed optical distance from the display;
    compare R and R'; and
    on condition that R>R', apply additional blurring to the virtual object using a radius R" given by:

$R'' = \operatorname{sqrt}(R*R - R'*R').$

12. The system of claim 11 wherein on condition that R<R', for each color channel of the virtual object, the computational blurring logic is adapted to sharpen the rendering of the virtual object on the display.

13. The system of claim 11 wherein the computational blurring logic is further adapted to apply an unsharp mask given by:

$$\text{Image\_unsharp} = K*\text{Image} - (K-1)*\text{Image\_blurred\_by\_filter}$$

where K is approximately 2, Image_unsharp is a virtual object intended for display, Image is an unprocessed virtual object, and Image_blurred_by_filter is a virtual object modified by the computational blurring logic.

14. The system of claim 1 wherein the computational blurring logic is further adapted to blur the virtual object in screen-space based on an optical depth of the virtual object, accounting for partial transparency of the virtual objects that occlude the virtual object in screen-space.

15. The system of claim 1 wherein the computational blurring logic is further adapted to sweep through the virtual objects determining whether they are near-field, far-field, or in-focus field for each color channel and applies a different degree of blur to each color channel.

16. The system of claim 1 wherein the computational blurring logic is adapted to compute a blur radius for each color channel in parallel.

17. The system of claim 1 wherein the computational blurring logic is further adapted to sample taps at a largest desired blurring radius for each color channel of the virtual object, selects only taps that are within a desired blur radius for a color channel, and for each color channel, averages selected taps.

18. A system comprising:
a display to render a plurality of virtual objects;
a ray tracer operating a Monte Carlo ray tracing algorithm that utilizes a point behind the thin lens model at a red focal distance to set a ray casting direction for the Monte Carlo ray tracing algorithm; and
logic configured to:
scan N levels of a scene comprising the virtual objects, each of the N levels associated with a degree of blurriness to apply to virtual objects in the level, wherein the degree varies from level to level;
apply the Monte Carlo ray tracing algorithm for each virtual object at each of the N levels;
compute a blur radius for each virtual object at each of the N levels based on the varying degree of blurriness to apply for the level;
additively blend each ray of the Monte Carlo ray tracing algorithm for each of the N levels into one rendered pixel; and
scale a contribution of each ray based on a difference between a desired blur radius for the level and a configured blur radius for the level.

* * * * *